US008838560B2

(12) United States Patent
Grieselhuber et al.

(10) Patent No.: US 8,838,560 B2
(45) Date of Patent: Sep. 16, 2014

(54) SYSTEM AND METHOD FOR MEASURING THE EFFECTIVENESS OF AN ON-LINE ADVERTISEMENT CAMPAIGN

(75) Inventors: Ray Grieselhuber, San Diego, CA (US); Brian Bartell, San Diego, CA (US); Dema Zlotin, La Jolla, CA (US); Russ Mann, Temecula, CA (US)

(73) Assignee: Covario, Inc., San Diego, CA (US)

( * ) Notice: Subject to any disclaimer, the term of this patent is extended or adjusted under 35 U.S.C. 154(b) by 1841 days.

(21) Appl. No.: 11/689,414

(22) Filed: Mar. 21, 2007

(65) Prior Publication Data

US 2008/0071767 A1 Mar. 20, 2008

Related U.S. Application Data

(60) Provisional application No. 60/868,705, filed on Dec. 5, 2006, provisional application No. 60/823,615, filed on Aug. 25, 2006, provisional application No. 60/868,702, filed on Dec. 5, 2006.

(51) Int. Cl.
*G06F 7/00* (2006.01)
*G06F 17/30* (2006.01)
*G06Q 10/04* (2012.01)

(52) U.S. Cl.
CPC .......... *G06F 17/30864* (2013.01); *G06Q 10/04* (2013.01)
USPC ....................................................... 707/705

(58) Field of Classification Search
CPC ................... G06F 17/30705; G06F 17/30707; G06F 17/30864
USPC ............................................................. 707/5
See application file for complete search history.

(56) References Cited

U.S. PATENT DOCUMENTS

| 6,401,075 | B1 | 6/2002 | Mason et al. |
| 6,654,725 | B1 | 11/2003 | Langheinrich et al. |
| 6,925,442 | B1 | 8/2005 | Shapira et al. |
| 7,185,085 | B2 | 2/2007 | Bean |
| 7,206,838 | B2 | 4/2007 | Boyd et al. |
| 7,225,246 | B2 | 5/2007 | Shapira |
| 2002/0032608 | A1 | 3/2002 | Kanter |
| 2002/0073199 | A1 | 6/2002 | Levine et al. |
| 2002/0082901 | A1 | 6/2002 | Dunning et al. |

(Continued)

FOREIGN PATENT DOCUMENTS

| WO | WO2004003701 A2 | 1/2004 |
| WO | WO2004079551 A1 | 9/2004 |
| WO | WO2005052755 A2 | 6/2005 |

OTHER PUBLICATIONS

PCT, International Search Report, Mailed Nov. 3, 2008.

(Continued)

*Primary Examiner* — Jacob F Bétit
*Assistant Examiner* — Griselle Roland
(74) *Attorney, Agent, or Firm* — Cooley LLP

(57) ABSTRACT

A system and method for modeling and optimizing the effectiveness of search engine optimization ("SEO") initiatives and search engine marketing ("SEA") campaigns is described. Several embodiments include methods and systems for classifying each of a plurality of websites using at least one of a plurality of classifications. Data associated with the plurality of websites is then acquired. The acquired data is then analyzed to achieve a result which may be used to model or optimize the effectiveness of the SEO initiatives and SEA campaigns.

26 Claims, 7 Drawing Sheets

(56) References Cited

U.S. PATENT DOCUMENTS

| | | |
|---|---|---|
| 2002/0083188 A1 | 6/2002 | Hericy et al. |
| 2002/0112048 A1 | 8/2002 | Gruyer et al. |
| 2002/0154163 A1 | 10/2002 | Melchner |
| 2002/0161648 A1 | 10/2002 | Mason et al. |
| 2003/0014519 A1 | 1/2003 | Bowers et al. |
| 2003/0046389 A1 | 3/2003 | Thieme |
| 2003/0074252 A1 | 4/2003 | Chandler-Pepelnjak et al. |
| 2003/0105677 A1 | 6/2003 | Skinner |
| 2003/0172349 A1 | 9/2003 | Katayama et al. |
| 2003/0208578 A1 | 11/2003 | Taraborelli et al. |
| 2004/0059625 A1 | 3/2004 | Schrader |
| 2004/0107137 A1 | 6/2004 | Skinner |
| 2004/0215509 A1 | 10/2004 | Perry |
| 2004/0215515 A1 | 10/2004 | Perry |
| 2004/0225562 A1 | 11/2004 | Turner |
| 2005/0010475 A1 | 1/2005 | Perkowski et al. |
| 2005/0065928 A1 | 3/2005 | Mortensen et al. |
| 2005/0137939 A1* | 6/2005 | Calabria et al. ................. 705/26 |
| 2005/0149396 A1 | 7/2005 | Horowitz et al. |
| 2005/0209920 A1 | 9/2005 | Stubbs et al. |
| 2005/0234953 A1 | 10/2005 | Zhang et al. |
| 2005/0256954 A1 | 11/2005 | Shapira et al. |
| 2005/0262050 A1 | 11/2005 | Fagin et al. |
| 2005/0288954 A1 | 12/2005 | McCarthy et al. |
| 2006/0069663 A1 | 3/2006 | Adar et al. |
| 2006/0080239 A1* | 4/2006 | Hartog ............................ 705/40 |
| 2006/0080321 A1 | 4/2006 | Horn et al. |
| 2006/0085408 A1 | 4/2006 | Morsa |
| 2006/0117002 A1 | 6/2006 | Swen |
| 2006/0129453 A1 | 6/2006 | Gardner et al. |
| 2006/0167749 A1 | 7/2006 | Pitkow et al. |
| 2006/0173822 A1 | 8/2006 | Watson et al. |
| 2006/0253345 A1 | 11/2006 | Herber |
| 2007/0027754 A1 | 2/2007 | Collins et al. |
| 2007/0067217 A1* | 3/2007 | Schachter et al. ............... 705/14 |
| 2007/0067331 A1* | 3/2007 | Schachter et al. ............ 707/102 |
| 2007/0112959 A1 | 5/2007 | Bean |
| 2007/0156621 A1 | 7/2007 | Wright et al. |
| 2008/0010142 A1 | 1/2008 | O'Brien et al. |
| 2008/0109318 A1 | 5/2008 | Szmanda |
| 2008/0133500 A1 | 6/2008 | Edwards et al. |

OTHER PUBLICATIONS

Jutla, Dawn et al., Developing Internet E-Commerce Benchmarks, In Systems Archive. vol. 24, Issue 6 (Sep. 1999)—Special issue on information systems support for electronic commerce. pp. 475-493. Year of Publ. 1999. [retrieved on Jul. 17, 2007]. Retrieved from the internet ,URL: http://www.e-gov.gr/local/ism-egov/resources-egov/information%20Systems%20-%20Developing%20Internet%20eCommerce%20Benchmarks.pdf>.

PCT Notification of Transmittal of the International Search Report for International Application No. PCT/US 07/62736 filed on Feb. 23, 2007.

PCTUS07086552 International Search Report Mailed Oct. 31, 2008.

U.S. Appl. No. 11/689,406 Final Rejection mailed Apr. 27, 2010.

U.S. Appl. No. 11/689,406 Non-Final Rejection mailed Oct. 26, 2009.

U.S. Appl. No. 11/689,406 Non-Final Rejection mailed Apr. 15, 2009.

PCT/US07/076798 International Search Report and Written Opinion mailed Oct. 30, 2008.

U.S. Appl. No. 11/758,592 Non-Final Rejection mailed Sep. 1, 2011.

U.S. Appl. No. 12/329,391 Non-Final Rejection mailed Dec. 22, 2010.

U.S. Appl. No. 12/329,391 Final Rejection mailed May 24, 2011.

Wilson, Bill "The Machine Learning Dictionary,"Cse.unsw.edu.au. University of Southern Wales, Aug. 30, 2000. Web. Dec. 6, 2010 <http://www.cse.unsw.edu.au/~billw/mldict.html>.

* cited by examiner

SYSTEM AND METHOD FOR MEASURING THE EFFECTIVENESS OF AN ON-LINE ADVERTISEMENT CAMPAIGN

PRIORITY

The present application claims priority to U.S. provisional application No. 60/868,705, entitled "System and Method for Measuring the Effectiveness of an Online Advertisement Campaign," filed on Dec. 5, 2006

CROSS-REFERENCE TO RELATED APPLICATIONS

This application relates to and incorporates by reference Provisional Application No. 60/778,594, entitled "System and Method for Managing Network-Based Advertising Conducted by Channel Partners of an Enterprise," filed on Mar. 1, 2006, Provisional Application No. 60/823,615, entitled, "System and Method for Aggregating Online Advertising Data and Providing Advertiser Services," filed on Aug. 25, 2006, Provisional Application No. 60/868,705, entitled "System and Method for Measuring the Effectiveness of an Online Advertisement Campaign," filed on Dec. 5, 2006, Provisional Application No. 60/868,702, entitled "Centralized Web-Based Software Solution for Search Engine Optimization," filed on Dec. 5, 2006.

FIELD OF THE INVENTION

The invention relates to, among other things, methods and systems for modeling and optimizing the effectiveness of a search engine marketing campaign ("SEM") including search engine optimization ("SEO") initiatives and search engine advertising ("SEA") campaigns (e.g., pay-per-click and paid inclusion campaigns). In particular, but not by way of limitation, aspects of the invention pertain to one or more centralized web-based software solutions that measure the effectiveness of its SEM campaigns (i.e., SEO initiatives and SEA campaigns) with respect to one or more specified time periods, paid search engine results, organic search engine results, search engines, keywords, keyword groups, and/or classified business entities.

BACKGROUND OF THE INVENTION

With the growth of search engines, more and more business entities are dedicating greater portions of their marketing budgets to interactive marketing, search engine marketing ("SEM") campaigns including search engine optimization ("SEO") initiatives and search engine advertising ("SEA") campaigns (e.g., pay-per-click and paid inclusion campaigns). With respect to SEA campaigns, a business entity pays a search engine to place the business entity's advertisements in a sponsored section of the search engine's search engine results page any time an Internet user searches, via the search engine, for a specific key word or phrase. With respect to SEO initiatives, a search engine sends automated crawlers to a business entity's website ("site") and create an index of all pages found. When a search engine user performs a search using a key word or phrase, a link and description of the best matching page within the entire search engine index is presented. The effectiveness of a business entity's SEM commercial efforts is also dependant on the SEM activities of competitors and affiliates of the business entity. Unfortunately, previously-known, automated technology has not enabled a business entity to measure the effectiveness of the SEM activities of its affiliates and competitors with respect to listings of paid advertisements and organic search engine results associated with various search engines.

SUMMARY OF THE INVENTION

Exemplary embodiments of the invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one aspect, the invention provides a system and method for modeling and optimizing the effectiveness of search engine marketing ("SEM") campaigns including search engine optimization ("SEO") initiatives and search engine advertising ("SEA") campaigns (e.g., pay-per-click and paid inclusion campaigns) is described. The inventive systems and methods include classifying each of a plurality of websites using at least one of a plurality of classifications, acquiring data associated with the plurality of websites, and analyzing the data to achieve a result that may then be used to model or optimize the effectiveness of the SEO initiatives and/or SEA campaigns. In one embodiment, for example, the plurality of classifications include at least a personal classification, an affiliate classification, and a competitor classification.

BRIEF DESCRIPTION OF THE DRAWINGS

Various objects and advantages and a more complete understanding of the invention are apparent and more readily appreciated by reference to the following Detailed Description and to the appended claims when taken in conjunction with the accompanying Drawings wherein:

FIG. 4 shows two tables representative of a portion of potential data gathered in accordance with certain aspects of the invention;

FIG. 5 illustrates a first user interface that may be presented to a user in accordance with certain aspects of the invention;

DETAILED DESCRIPTION OF EMBODIMENTS OF THE INVENTION

The invention generally relates to a system and method for modeling and optimizing the effectiveness of search engine marketing ("SEM") campaigns including search engine optimization ("SEO") initiatives and search engine advertising ("SEA") campaigns (e.g., pay-per-click and paid inclusion campaigns). Embodiments of the invention permit a client business entity to measure the effectiveness of its SEO initiative or SEA campaign as it compares to SEO initiatives or SEA campaigns of one or more classified affiliates, competitors or any other types of business entities. More particularly, the embodiments of the invention permit the business entity to measure the effectiveness of its SEO initiatives or SEA campaigns with respect to one or more specified time periods, paid search engine results, organic search engine results, search engines, keywords, keyword groups, and/or classified business entities.

Figure 1:
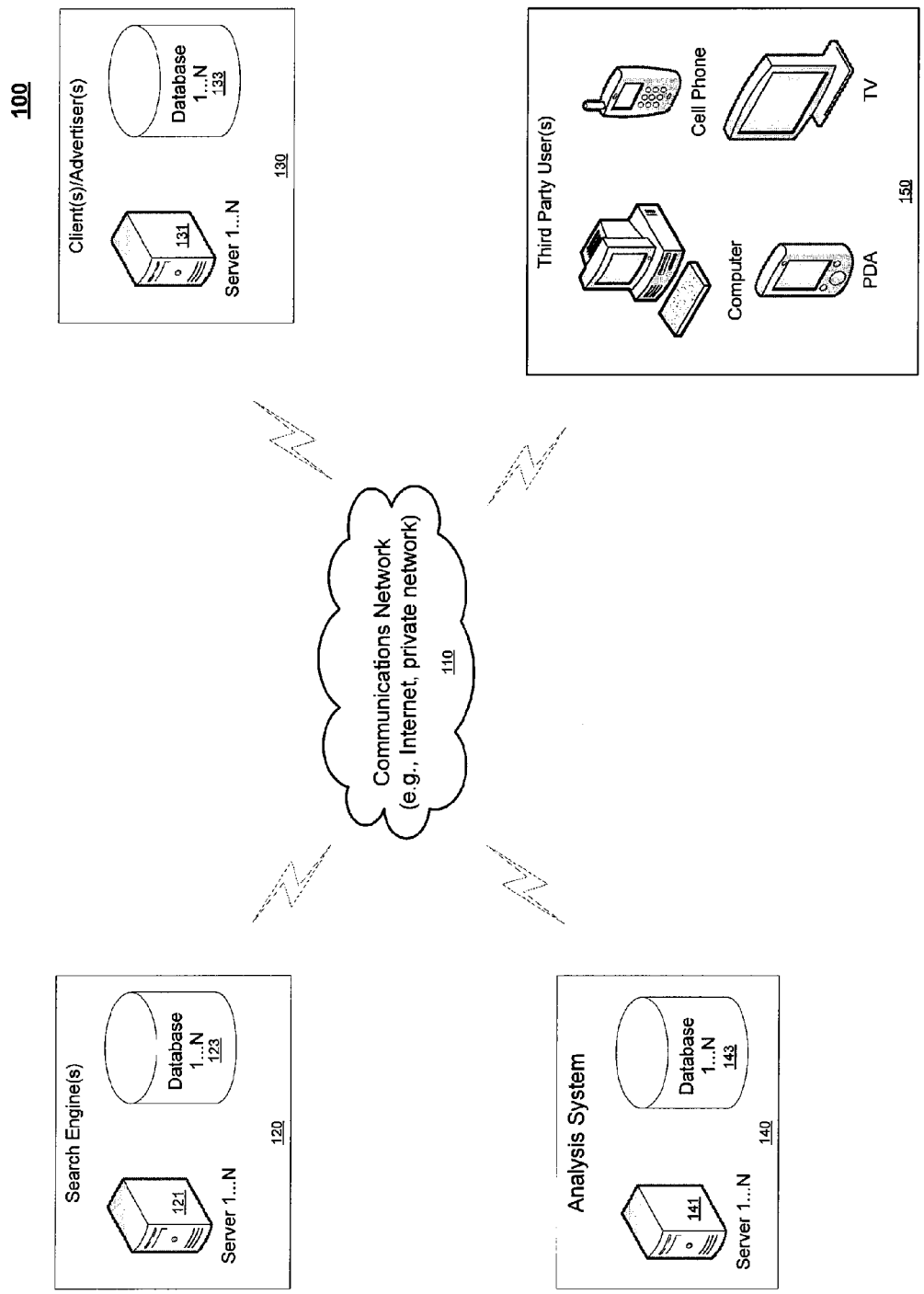
FIG. 1 shows a block diagram depicting a typical network system 100 for analyzing search engine optimization ("SEO") initiatives and search engine advertising ("SEA") campaigns.

Aspects of the invention are designed to operate on computer systems, servers, and/or other like devices. While the details of embodiments of the invention may vary and still be within the scope of the claimed invention, FIG. 1 shows a block diagram depicting a typical network system 100 for analyzing SEO initiatives and SEA campaigns in accordance with the invention. The network system 100 is only one example of a suitable computing environment and is not intended to suggest any limitation as to the scope of use or functionality of the invention. Neither should the network system 100 be interpreted as having any dependency or requirement relating to any one or combination of components illustrated in the exemplary network system 100.

Aspects of the invention may be described in the general context of computer-executable instructions, such as program modules, being executed by a computer or server. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

As is shown, the network system 100 includes a communications network 110, such as the Internet or a private network, capable of providing communication between devices at search engine(s) 120, client(s) 130 (e.g., an Internet advertiser), SEO initiative and/or SEA campaign analysis system 140, and third party user(s) 150 described hereinafter. The devices of FIG. 1 communicate with each other via any number of methods known in the art, including wired and wireless communication pathways.

As shown in FIG. 1, a search engine 120 is accessible by a third party user 150, a client 130, and by the analysis system 140. The third party user 150 may utilize any number of computing devices that are configured to retrieve information from the World Wide Web ("WWW"), such as a computer, a personal digital assistant ("PDA"), a mobile phone, a television or other network communications-enabled device. The client 130 is typically a business entity with one or more online or interactive marketing campaigns associated with the search engine 120. The analysis system 140 operates one or more servers 141 capable of Internet-based communication with the search engine 120 and the client 130. The analysis system 140 includes a database 143 which may be described as a hard disk drive for convenience, but this is certainly not required, and one of ordinary skill in the art will recognize that other storage media may be utilized without departing from the scope of the invention. In addition, one of ordinary skill in the art will recognize that the database 143, which is depicted for convenience as a single storage device, may be realized by multiple (e.g., distributed) storage devices.

As is discussed below, the analysis system 140 enables the client 130 to model the effectiveness of a SEO initiative and/or SEA campaign with respect to other SEO initiatives and/or SEA campaigns of the client 130 or business entities other than the clients 130 (not shown). It is a feature of embodiments of the invention that these models enable the client 130 to quickly identify marketing inefficiencies and/or opportunities.

As those skilled in the art will appreciate, various intermediary network routing and other elements between the communication network 110 and the devices depicted in FIG. 1 have been omitted for the sake of simplicity. Such intermediary elements may include, for example, the public-switched telephone network ("PSTN"), gateways or other server devices, wireless network devices, and other network infrastructure provided by Internet service providers ("ISPs").

Figure 2:
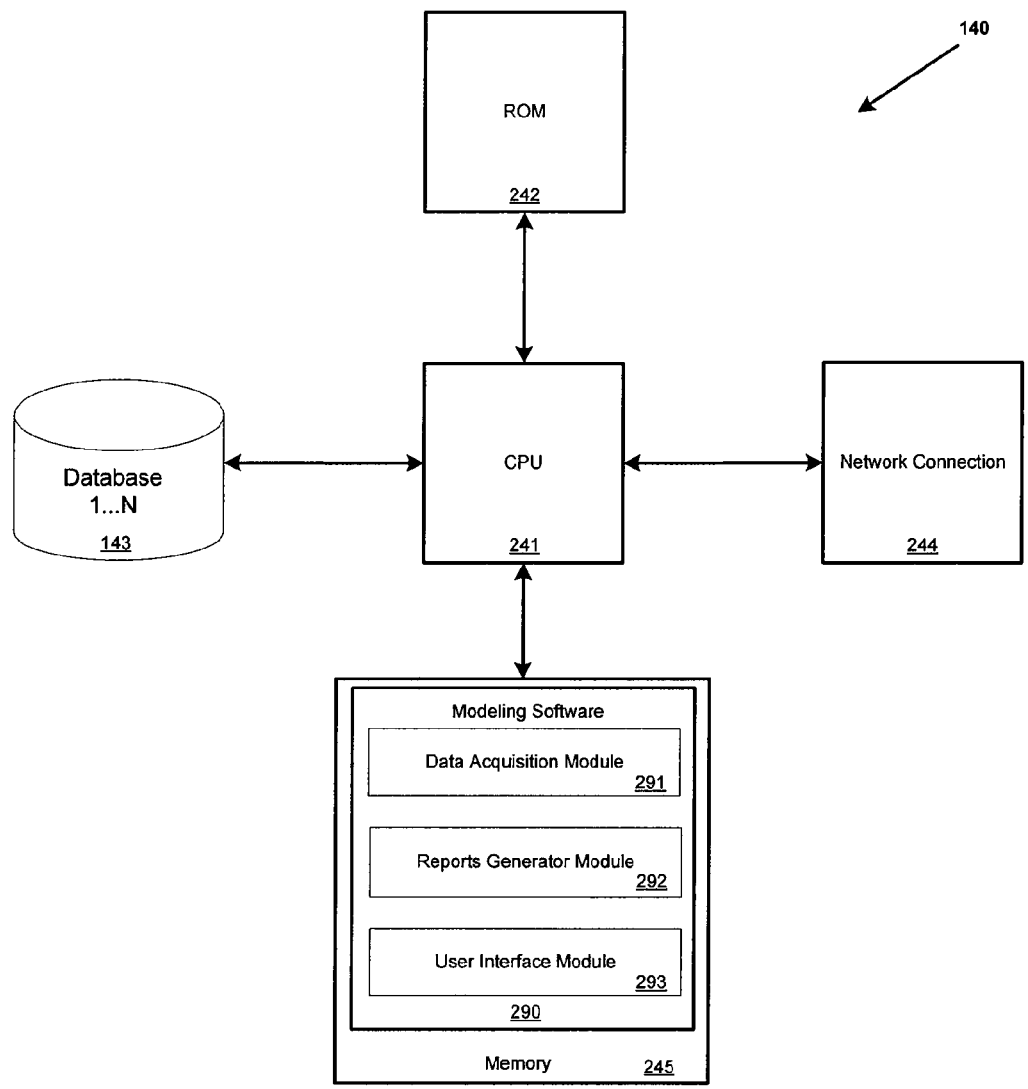
FIG. 2 illustrates one implementation of an SEO initiative and/or SEA campaign analysis system.

Attention is now drawn to FIG. 2, which depicts one implementation of the analysis system 140. As is shown, the analysis system 140 may include, but not by way of limitation, a processor 241 coupled to ROM 242, the database 143, a network connection 244, and memory 245 (e.g., random access memory (RAM)).

As shown, a software solution 290 includes a data acquisition module 291, a report generator module 292, and a user interface ("UI") module 293, all of which are implemented in software and are executed from the memory 244 by the processor 241. The solution 290 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the invention. Each module 291-293 is associated with one or more functions of the invention describe herein.

Basic Operation of the Software Solution

In general terms, the solution 290 analyzes the SEO initiatives and/or SEA campaigns of the client 130 with respect to data collected from search engines, web analytics programs, content sources (e.g., video, image, document and various other non-html file sources), websites, and/or third party data sources that publish web-related statistics. The solution 290 may make recommendations regarding strategic improvements with respect to the client's SEO initiatives and/or SEA campaigns. For example, the solution 290 may make recommendations pertaining to the ranking of a client's website ("site") in paid search engine results. Such recommendations may pertain to increasing a bid associated with a particular key word or group of keywords. Alternatively, the solution 290 may make recommendations pertaining to the ranking of a client's site in organic search engine results. Such recommendations may pertain to optimization of a site's construction in order to improve an organic ranking of the site in search engine results. The solution 290 may also make recommendations based on previous recommendations and competitive gains or degradations.

One of skill in the art will appreciate alternative recommendations. For an additional and non-exclusive list of recommendations, refer to Provisional Application No. 60/823,615, entitled, "System and Method for Aggregating Online Advertising Data and Providing Advertiser Services," filed on Aug. 25, 2006, and Provisional Application No. 60/868,702, entitled "Centralized Web-Based Software Solution for Search Engine Optimization," filed on Dec. 5, 2006.

Figure 3:
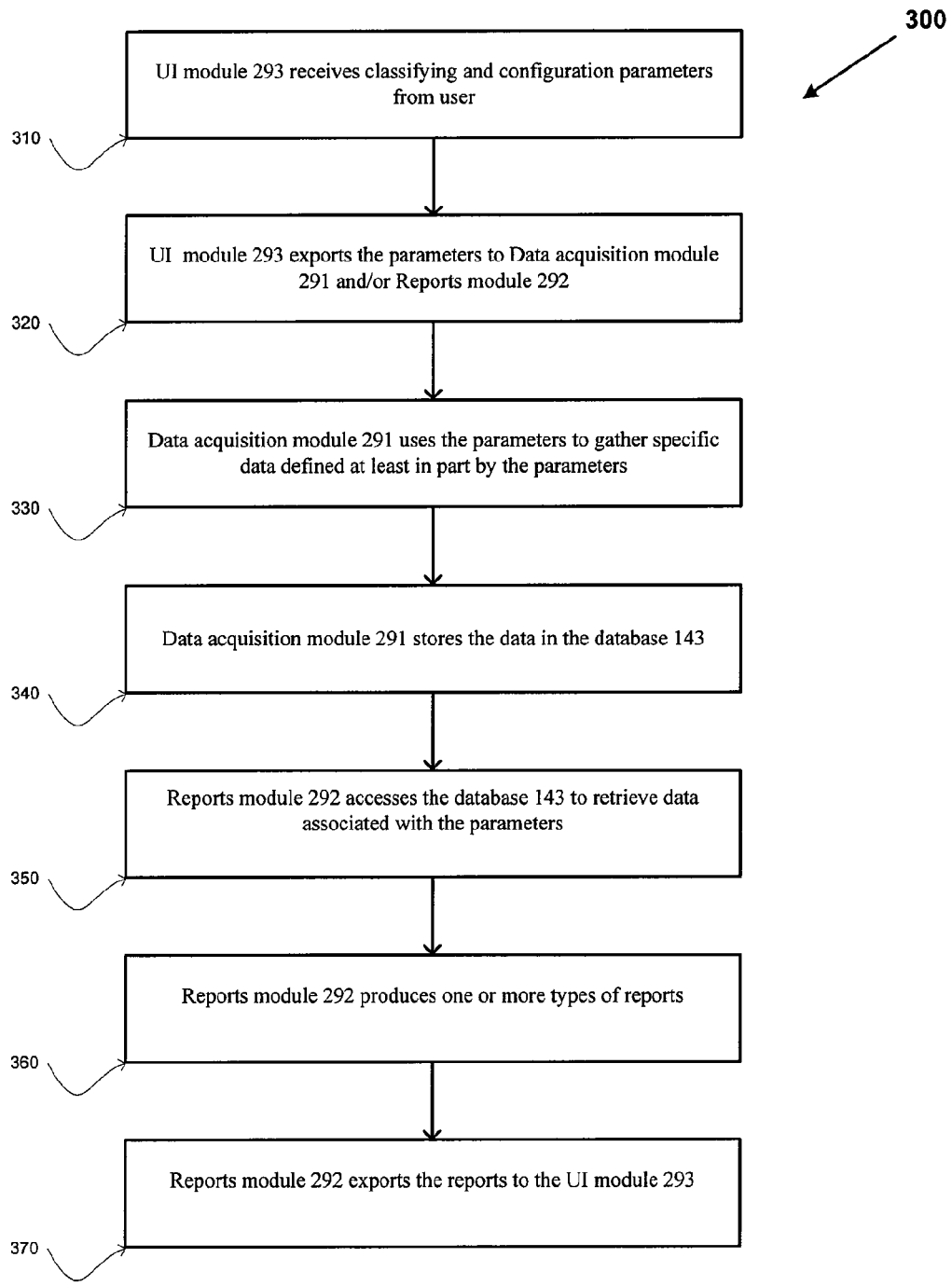
FIG. 3 depicts a process flow diagram illustrating steps taken by a software solution in accordance with one embodiment of the invention.

The modules 291-293 operate in concert with each other to perform certain functions of the solution 290. By way of example, FIG. 3 depicts a process flow diagram 300 illustrating steps taken by the solution 290 in accordance with one embodiment of the invention. As shown in step 310, the UI module 293 may receive classifying and configuration parameters from a user (e.g., a system administrator, the client 130). The UI module 293, in step 320, may export such parameters to the data acquisition module 291 and/or the reports module 292. The classifying and configuration parameters may pertain to system administration parameters that apply to general implementations of the solution 290 (e.g., pre-configured data extraction, pre-configured classifications pertaining to business entities) or to instantaneous parameters that apply to specific implementations of the solution 290 at any given time (e.g., real-time data extraction, real-time classifications pertaining to business entities).

The data acquisition module 291, in step 330, uses the parameters to gather specific data defined at least in part by the parameters. The data acquisition module 291 may gather data from any number of sources, including one or more search engine files, one or more content source files (e.g., video, image, document and various other non-html files), one or more web files associated with the client(s) 130, one or more web files associated with other business entities, one or more web analytics system files, and/or one or more third party data sources that publish web-related statistics.

Upon gathering data, the data acquisition module 291, in step 340, stores the data in the database 143. The reports module 292, in step 350, accesses the database 143 to retrieve data associated with the classifying and configuration parameters, and then produces one or more types of reports in step 360. In step 370, the generated reports are exported to the UI module 293, which displays one or more visual representations of the reports to the user.

One of skill in the art will appreciate alternative embodiments where one or more steps of FIG. 3 are omitted, rearranged, or performed by alternative modules (not shown) of the solution 290.

Data Acquisition Module

The data acquisition module 291 performs any number of tasks. One task, for example, includes receiving classifying parameters derived by the client 130, the analysis system 140, or an alternative source. The classification parameters include one or more classifications pertaining to one or more business entities or business assets related to the client 130. Business assets, for example, may pertain to a website ("site"), a webpage ("page"), content of a page, or other business assets conceivable by those skill in the art.

For the sake of simplicity, classifications as discussed herein include a personal classification, an affiliate classification and a competitor classification. One of skill in the art will appreciate alternative classifications. As used herein, the personal classification is assigned to a business asset of the client 130, the affiliate classification is assigned to an affiliate (i.e., "friendly") business asset of the client 130, and the competitor classification is assigned to a competitor (i.e., "adverse") business asset of the client 130.

Classifications of certain business assets may be determined based on the content of the business asset. For example, content may be given a competitor classification if the content pertains to a type of product sold or manufactured by the client 130.

Additionally, a classification of a particular business asset or business entity may differ under certain circumstances. For example, a business asset such as a site or a page may be assigned a competitor classification for a first keyword (e.g., "laptop") and an affiliate classification for a second keyword (e.g., "printer"). Under such circumstances, the client 130 may consider the business entity/asset a threat in the laptop commercial space and may consider the business entity/asset an ally in the printer commercial space (e.g., because the client 130 is in joint sales or manufacture with the business entity/asset).

Another task of the data acquisition module 291 includes gathering data for use by the reports module 292 in generating one or more reports that are visually represented via the UI module 293. The data may be gathered from any number of sources. For a non-exhaustive list of sources, including one or more search engine files, one or more content source files (e.g., video, image, document and various other non-html files), one or more web files associated with the client(s) 130, one or more web files associated with other business entities, one or more web analytics system files, and/or one or more third party data sources that publish web-related statistics.

By way of a first example, the data collected by the data acquisition module 291 may be indicative of one or more ranked positions of one or more websites ("sites") or web pages ("pages") as those ranked positions appear within one or more search engine results that are based on one or more search terms (e.g., one or more keywords) inputted at one or more search engines. The ranked positions, which may include only those ranked positions that occur within a specified range of ranks (e.g., $1^{st}$-$30^{th}$), may pertain to organic search engine results or paid search engine results. The data may be indicative of a number of ranked positions for each of the sites or pages, a ranking value of each ranked position, at total number of ranked positions for specified business entities/assets, and/or a total number of ranked positions within the specified range of ranks, among others.

By way of a second example, the data collected by the data acquisition module 291 may be indicative of text displayed within or accessible via search engine results. Additionally, the text is associated with particular business entities/assets. The text may include any number of preconfigured textual patterns. Such preconfigured textual patterns may reflect branding text associated with the client (e.g., a name of a product manufactured by the client 130). Other preconfigured textual patterns may reflect classification-related text that may be used to classify content in which the preconfigured textual patterns exist.

By way of a third example, the data acquisition module 291 may also collect data from third party sources that publish statistics including one or more of the following: 1) an average click rate at which user(s) of search engine(s) click on a web link associated with a business entity and listed within search engine results; 2) the ranking of the web link in each of the search engine results; 3) the URL associated with the web link; and 4) an average volume of searches per different keywords.

One of skill in the art will appreciate alternative forms of data within both the scope and spirit of the invention that the data acquisition module 291 may acquire.

Figure 4:
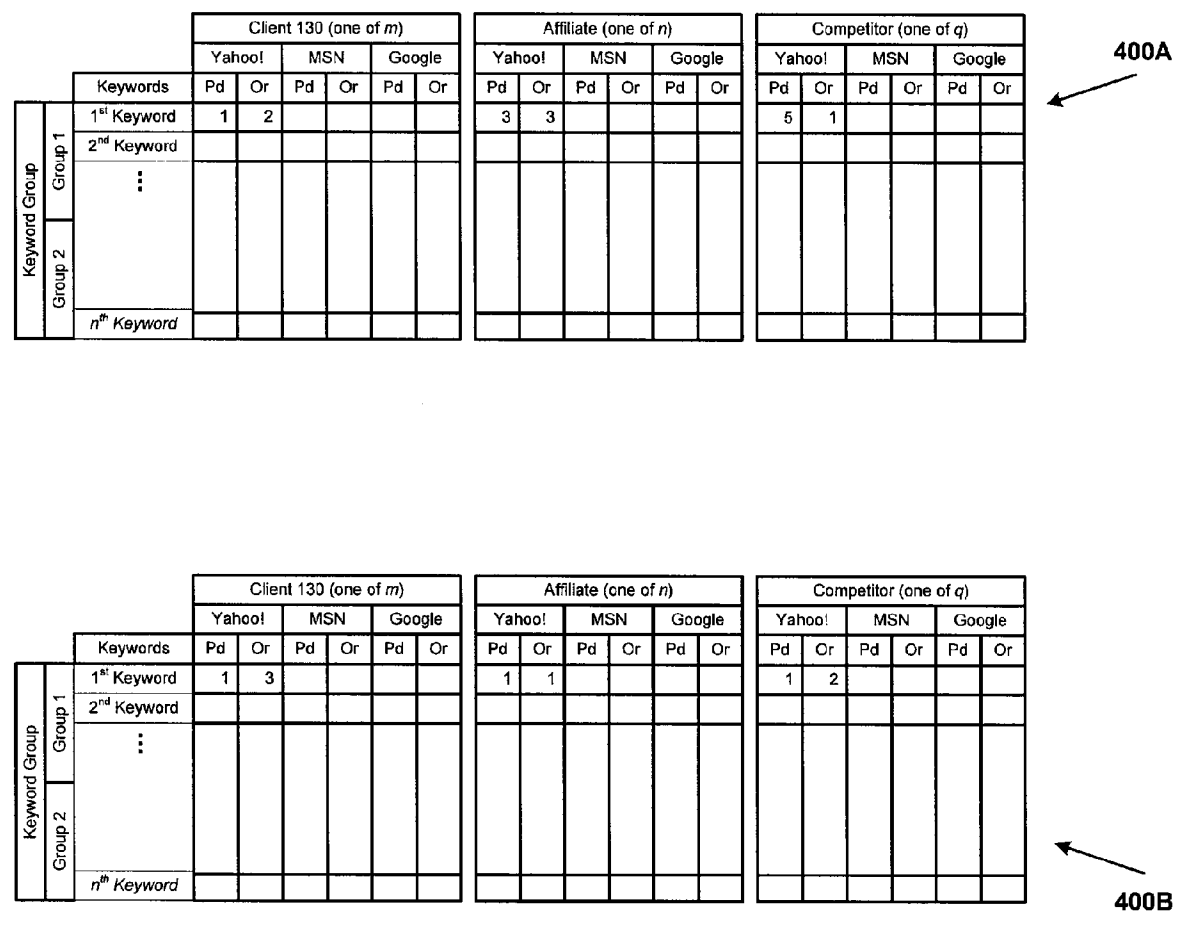

Attention is now drawn to FIG. 4, which illustrates tables 400A and 400B representative of a portion of potential data gathered by the data acquisition module 291. As shown, each table 400A and 400B includes one or more client columns 1-$m$, one or more affiliate columns 1-$n$ and one or more competitor columns 1-$q$. The columns 1-$m$, 1-$n$ and 1-$q$ pertain to one or more pages or groups of pages operated by the client 130, affiliate business entities of the client 130 and competitor business entities of the client 130, respectively.

As shown in FIG. 4, each column for tables 400A and 400B segments data into one or more search engines (e.g., Yahoo!, MSN, Google), as well as paid search engine results (e.g., 'Pd') and organic search engine results (e.g., 'Or'). For each column of table 400A, rankings with respect to one or more keywords (or groups of keywords) are displayed. For example, the client 130 ranks first and second on Yahoo!'s paid and organic search engine results, respectively, for a first keyword. With respect to the first keyword, an affiliate of the client 130 ranks third and third in the paid and organic search engine results for Yahoo!, respectively, and a competitor ranks fifth and first in the paid and organic search engine results for Yahoo!, respectively. Table 400B is similar to table 400A, except it displays the number of ranked positions for the client 130, affiliate business entities of the client 130, and competitor business entities of the client 130.

Report Generator Module

Attention is drawn to the reports module 292 of FIG. 2, which functions to receive parameters from the UI module 293, retrieve data from the database 143, generate one or more reports based on the parameters and the retrieved data, and then send the generated reports to the UI module 293. The generation of reports may be automated (e.g., the generation of reports occurs at specified time intervals). When generating the reports, the reports module 292 may use any number of linear and/or non-linear combinations on-linear combinations involving one or more scored representations to achieve quantifiable metrics pertinent to the client 130. The quantifiable metrics may then be used in any number of displays (e.g., charts, graphs, static and streaming graphics) to alert the client 130 to potential enhancements of the SEO initiatives and/or SEA campaigns of the client 130.

A combination may include, by way of example, a mathematical operation such as addition, subtraction, multiplication, division, weighting, and averaging, among others.

A scored representation may include, but not by way of limitation, an alphanumeric representation of data collected by the data acquisition module 291 (e.g., 0, 1, 2, ..., n and a, b, c, ... z) and/or an alphanumeric representation of a resultant value derived from one or more linear/non-linear combinations. In some embodiments, the scored representations include the actual data collected (e.g., a number of ranked positions associated with a business entity, an actual ranking value of a web link associated with a business entity, and/or other data including data described with respect to the data acquisition module 291).

A quantifiable metric may be, for example, indicative of a feature of a site that may be used to model or optimize an SEO initiative or an SEA campaign. By way of example, in one embodiment a feature may reflect an inefficient or an unrealized use of a keyword with respect of the site's paid search engine results (e.g., the feature may reflect an optimal bid level associated with the keyword). One of skill in the art will appreciate that a feature may reflect any number of optimizable aspects of SEO initiatives or SEA campaigns. For example, features may reflect accessibility-related aspects, site construction-related aspects, and/or search engine-related aspects. For examples of these features, refer to Provisional Application No. 60/778,594, entitled "System and Method for Managing Network-Based Advertising Conducted by Channel Partners of an Enterprise," filed on Mar. 1, 2006, Provisional Application No. 60/823,615, entitled, "System and Method for Aggregating Online Advertising Data and Providing Advertiser Services," filed on Aug. 25, 2006, and Provisional Application No. 60/868,702, entitled "Centralized Web-Based Software Solution for Search Engine Optimization," filed on Dec. 5, 2006.

As stated above, the reports module 292 may employ computations that are configurable in terms of scored representations and combinations. One of skill in the art will appreciate that any number of combinations of any number of scored representations may be used to achieve quantifiable metrics pertinent to the client 130.

For example, a first scored representation may be weighted, a second scored representation may be weighted, the resultant weighted scored representations may be summed to achieve a summed result, and the summed result may be divided by a sum of the weights. In such a case, the reports module 292 employs four combinations: 1) the weighting of the first scored representation, 2) the weighting of the second scored representation, 3) the summing of the two weighted scored representations, and 4) the dividing of the summed weighted scored representations by the sum of the weights.

By way of another example, the reports module 292 may calculate the mean, mode, or average ranking of a site or pages of the site for a particular keyword or group of keywords. The average may be calculated across any number of search engines.

Alternatively, the reports module 292 may calculate a saturation percentage of a business entity of business asset. A saturation percentage, for example, may be calculated by dividing the number of ranked positions for a business entity/asset by the total number of ranked positions for specified business entities/assets (including the business entity/asset for which the saturation percentage is being calculated). Alternatively, the number of ranked positions for the business entity/asset may be divided by the number of potential ranked positions within a range of rankings (e.g. $1^{st}$-$30^{th}$). One of skill will appreciate that the saturation calculations may be averaged with respect to multiple search engines, business entities, business assets (e.g., sites, pages), keywords, and/or various other variables within both the scope and the spirit of the invention.

The reports module 292 may also analyze the text of search engine results to determine if a preconfigured textual patterns exist in the text (e.g., existence of the word "laptop", existence of the words "laptop" and "rebate" within n words of each other). Classification of textual patterns may be used to perform competitive analysis, brand compliance analysis (e.g., in affiliate relationships for reimbursement and credit), brand use authorization analysis, and search engine ranking analysis. When text of a business asset not operated or owned by the client 130 includes branding text (e.g., a name of a product manufactured by the client 130), the client 130 may choose to confirm whether brand compliance specifications are met and/or whether the use of the branding text is authorized, as well as for other brand management concerns. When text of a business asset not operated or owned by the client 130 includes competitive text (e.g., a word or words associated with a commercial endeavor of the client 130, such as "laptop" under circumstances where the client 130 sells or manufactures laptops or devices in direct competition with laptops), the client 130 may choose to bid higher on keywords associated with paid search results where strongly competitive ads are performing. In the case of organic search results, the client 130 may optimize content on a site it owns or operates or negotiate with affiliates to optimize their site content in order to lower the search result rankings of the competing asset/entity. In the case where the business asset is an affiliate business asset, the client 130 may choose to communicate with the affiliate business asset/entity and/or withhold co-marketing reimbursements, among other response.

The reports generator 292 may generate any number of reports in the case where the data acquisition module 291 collects data from third party sources that publish an average click rate at which user(s) of search engine(s) click on a web link associated with a business entity and listed within search engine results. For example, the reports generator 292 may use the average click rate for one or more web links to estimate a share of a site's/page's total volume of traffic from particular search engine results. Alternatively, the reports generator 292 may use the average click rate and the average volume to estimate a volume of visitors attributable to an actual or potential ranking of a web link associated with the site/page and listed within search engine results. By way of yet another example, the reports generator 292 may use the average click rate alone, or the average click rate and the average volume to estimate a potential share of traffic volume that may be achieved by improving the rank on the site/page in search engine results of one or more search engines. One of skill in the art will appreciate any number of combinations using any previously-described data retrieved from third party sources.

One of skill in the art will appreciate various approaches to generating reports, including generation of reports based on configurable groupings of data. The groupings of data may include data pertaining to different URLS, domains or business units of the client 130, affiliates of the client 130, or competitors of the client 130. Reports may also be generated to reflect trending of data over time and/or a snapshot of a particular instance of time.

User Interface ("UI") Module

The UI module 293 receives configuration parameters from a user, sends at least a portion of those parameters to the data acquisition module 291 and/or the reports module 292, receives one or more reports from the reports module 292, and displays one or more visual representations of the report(s) received from the reports module 292. The visual representations may be formed of alphanumerical, color-coded, graphical, image-based, text-based, video-based or any other type of representation.

The configuration parameters received by the UI module 293 define, at least in part, the scope of data collection by the data acquisition module 291 and/or the data retrieval by the reports generator 292. For example, the configuration parameters may define the scope of data collection and/or data retrieval in terms of one or more instances or periods of time (e.g., date ranges, triggered events). Alternatively or additionally, the configuration parameters may define the scope of data collection and/or data retrieval in terms of the types of data previously described with respect to the data acquisition module 291.

The configuration parameters also define, at least in part, the report(s) generated by the reports module 292. The configuration parameters allow a user to configure the visual representation of the generated reports. Such configuration parameters that configure the visual representation of the generated reports may include parameters similar to those described above with respect to the configuration parameters that define the scope of data collection and data retrieval. Additionally, the configuration parameters may include drill-down, online analytical processing (OLAP) and sorting (e.g., ascending or descending organization) parameters. Display parameters (e.g., numeric, color-coded, or video/image representation display parameters) may also be included in the configuration parameters.

Figure 5:
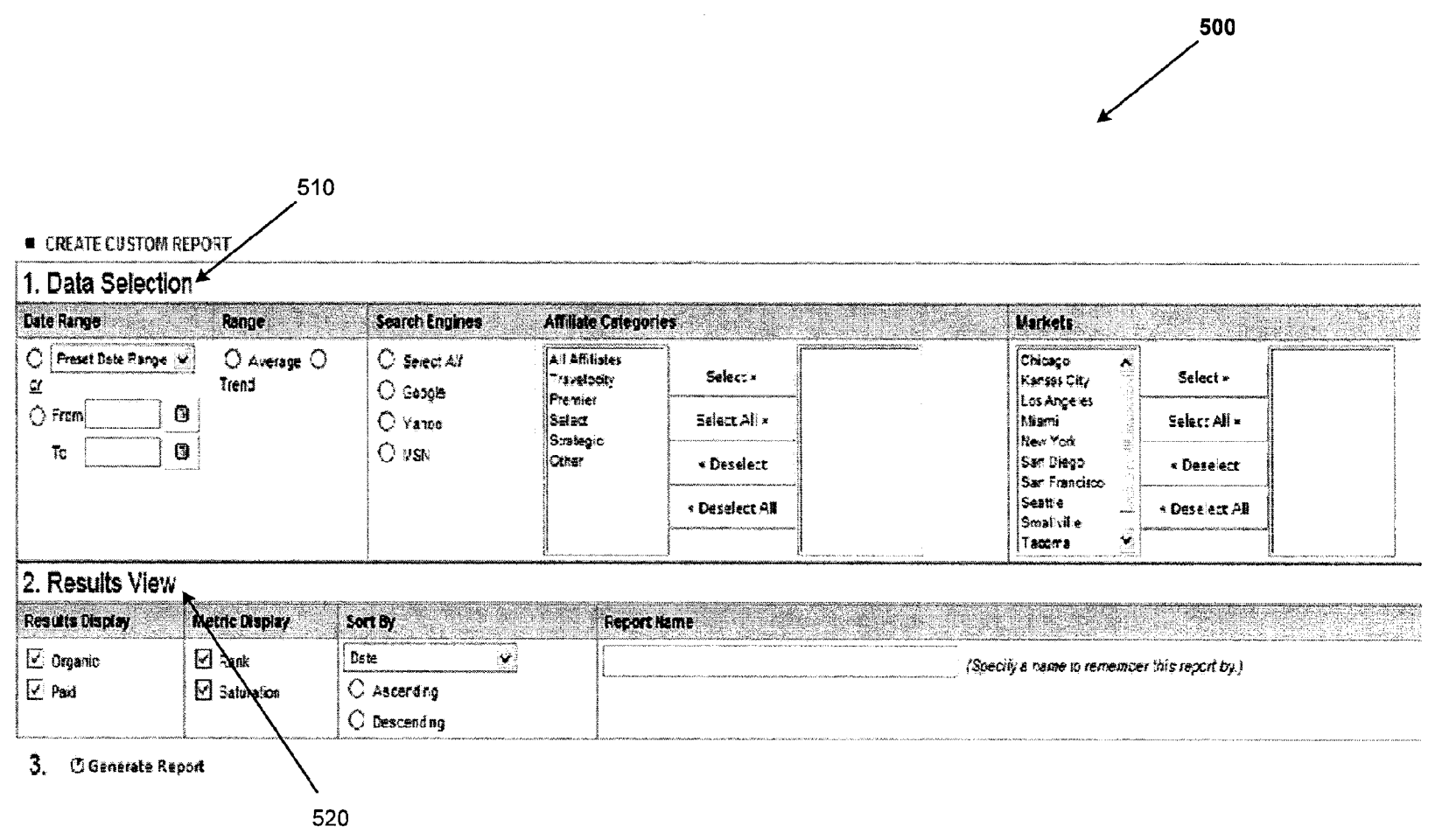

By way of example, FIG. 5 represents a user interface 500 that the UI module 293 presents to a user. The user interface 500 includes a data selection section 510 and a results view section 520. The data selection section 510 allows the user to input configuration parameters similar to those described above with respect to the UI module 293. The results view section 520 allows the user to input customization parameters similar to those described above with respect to the UI module 293.

Figure 6:
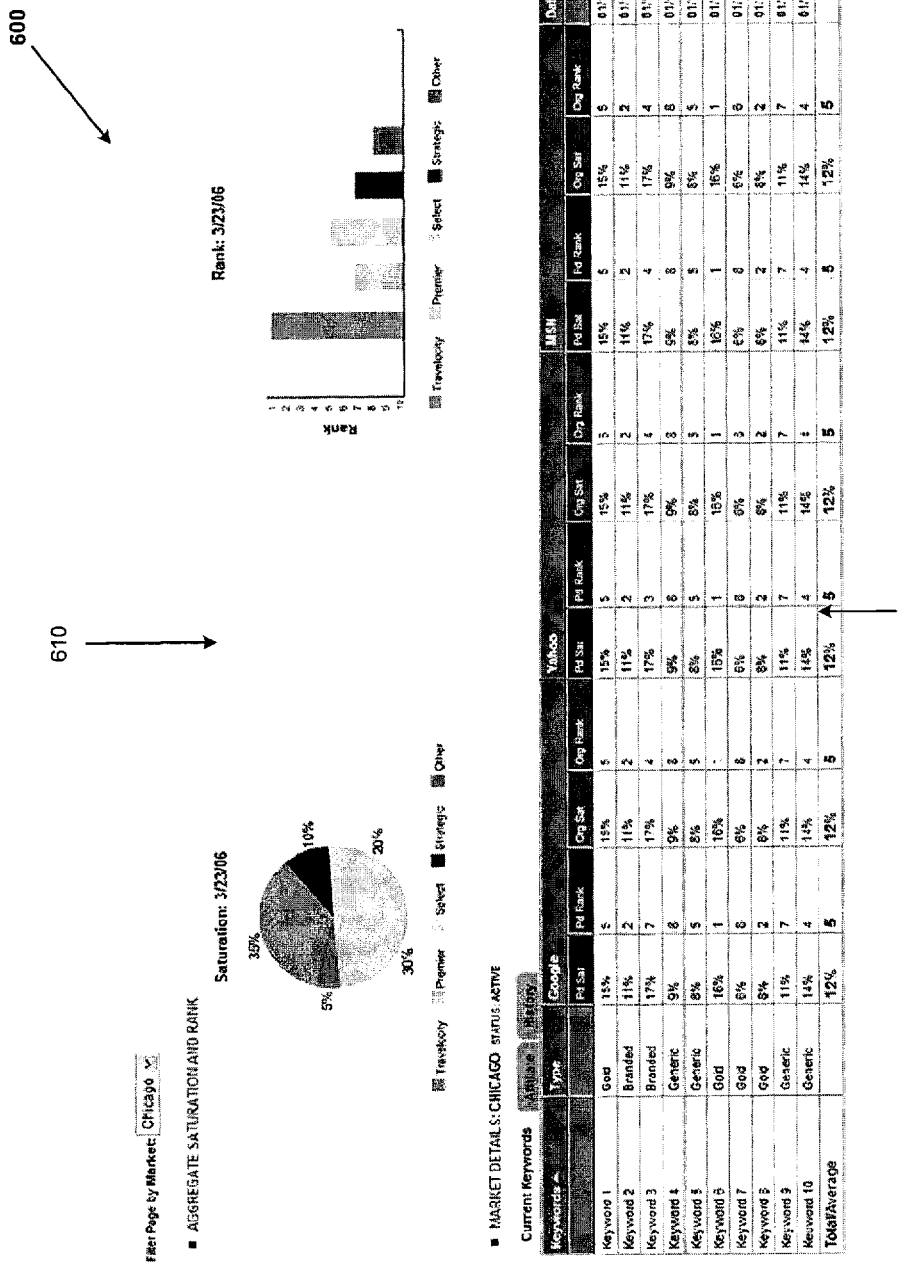
FIG. 6 illustrates a second user interface that may be presented to a user in accordance with one aspect of the invention.

The visual representation of the report(s) generated by the reports module 292 may be organized using various methods known in the art. For example, FIG. 6 represents a user interface 600 that the UI module 293 presents to a user. The user interface 600 includes one or more graphs 610 (e.g., a pie chart, a bar graph, a line chart, etc.) and one or more tables 620 that display configurable information. One of skill in the art will recognize that the user interface 500 may be animated to show changes over time.

One of skill in the art will appreciate alternative embodiments wherein all or a portion of the reports generated by the reports module 292 are accessible by one or more computer systems/visual displays external to the analysis system 140 (e.g., via triggered or automatic emailing or other methods within both the scope and spirit of the invention). One of skill in the art will also appreciate alternative embodiments in which the reports module 292 develops one or more reports when triggering events occur (i.e., after preconfigured circumstances).

Client Architecture

Figure 7:
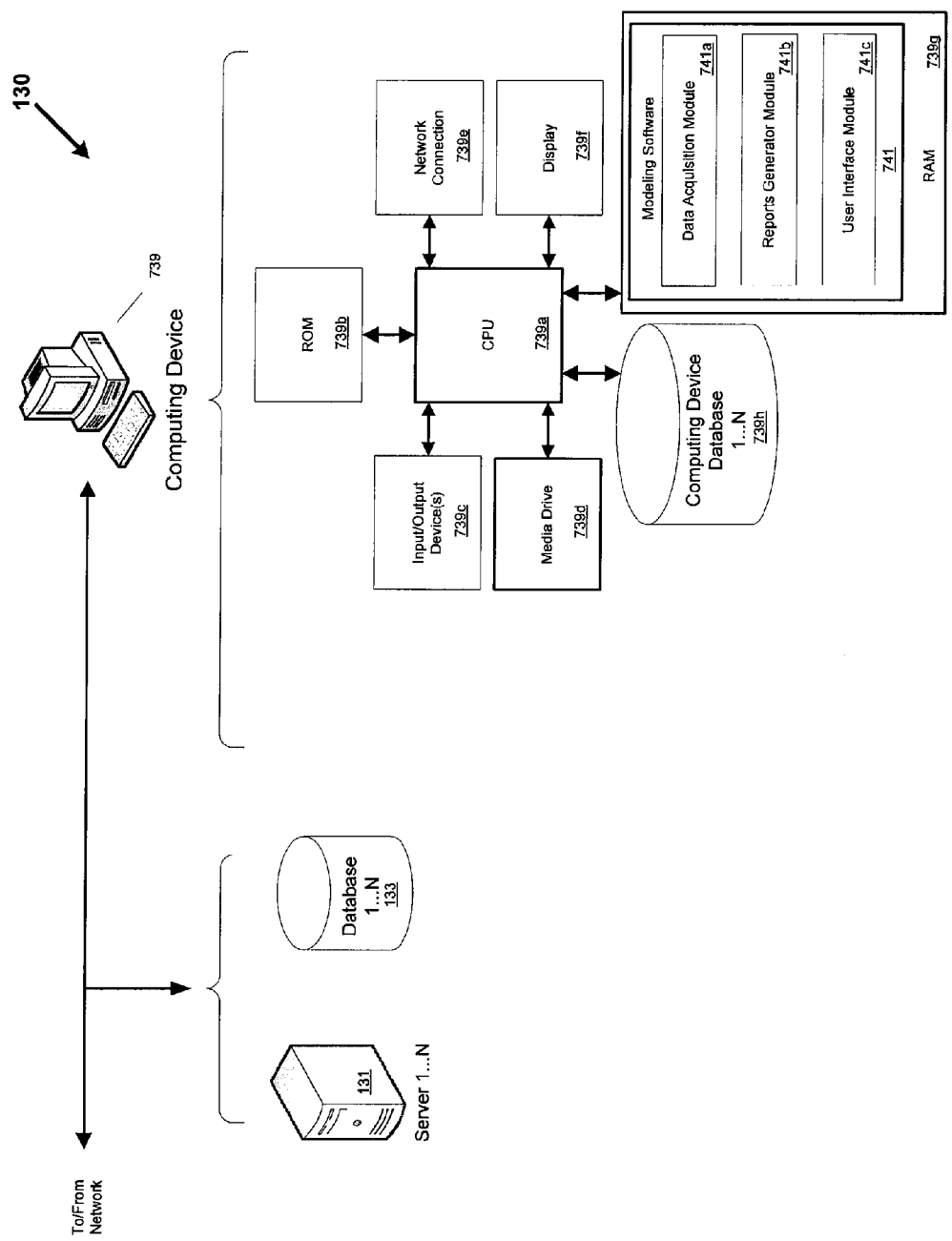
FIG. 7 shows a block diagram depicting an alternative system for analyzing SEO initiatives and SEA campaigns.

Attention is now drawn to FIG. 7, which depicts an exemplary implementation of the client 130. As is shown, the client 130 includes a server 131 connected to a database 133, both of which may communicate either directly or indirectly with the communication network 110. FIG. 7 also includes a computing device/system 739 configured in accordance with one implementation of the invention. The computing device 739 may include, but not by way of limitation, a personal computer (PC), a personal digital assistant (PDA), a cell phone, a television (TV), etc., or any other device configured to send/receive data to/from the communication network 110, such as consumer electronic devices and hand-held devices.

The implementation depicted in FIG. 7 includes a processor 739*a* coupled to ROM 739*b*, input/output devices 739*c* (e.g., a keyboard, mouse, etc.), a media drive 739*d* (e.g., a disk drive, USB port, etc.), a network connection 739*e*, a display 739*f*, memory 739*g* (e.g., random access memory (RAM)), and a file storage device 739*h*.

The storage device 739*h* is described herein in several implementations as a hard disk drive for convenience, but this is certainly not required, and one of ordinary skill in the art will recognize that other storage media may be utilized without departing from the scope of the invention. In addition, one of ordinary skill in the art will recognize that the storage device 739*h*, which is depicted for convenience as a single storage device, may be realized by multiple (e.g., distributed) storage devices.

As shown, a software solution 741 includes a data acquisition module 741*a*, a reports generator module 741*b*, a user interface module 741*c*, all of which are implemented in software and are executed from the memory 739*g* by the processor 739*a*. The software 741 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the invention. Each module 741*a,b* and *c* functions similarly to modules 291, 292 and 293, respectively, of FIG. 2.

The exemplary systems and methods of the invention have been described above with respect to the analysis system 140 and/or the client 130. One of skill in the art will appreciate alternative embodiments wherein the functions of the analysis system 140 are performed on other devices in the networked system 100.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computer program product, comprising a non-transitory computer readable medium having a computer readable program code embodied therein, said computer readable program code adapted to be executed to implement a method, comprising:
classifying each of a plurality of websites using at least one of a plurality of classifications;
acquiring data associated with the plurality of websites, wherein the data includes data pertaining to one or more ranked positions within a range of ranked positions that are associated with the plurality of websites and associated with one or more search engine results with respect to one or more keywords;
wherein the data pertaining to the one or more ranked positions includes a first number of ranked positions associated with a subset of the one or more websites; and
analyzing the data to achieve a result.

2. The computer program product of claim 1, wherein the data further includes a total number of ranked positions within the range of ranked positions that are associated with the one or more search engine results; and wherein the analyzing includes dividing the first number of ranked positions by the total number of ranked positions to achieve the result.

3. The computer program product of claim 1, wherein the data pertaining to one or more ranked positions includes a ranking value for each of the one or more ranked positions.

4. The computer program product of claim 3, wherein the analyzing includes determining an average ranking of ranked positions for at least one website of the one or more websites.

5. The computer program product of claim 1, wherein the one or more search engine results include organic search engine results and paid search engine results.

6. The computer program product of claim 1, wherein the data includes text associated with a first website of the one or more websites and acquired from one or more search engine results.

7. The computer program product of claim 6, wherein the analyzing includes determining whether a preconfigured textual pattern exists in the text.

8. The computer program product of claim 7, wherein the preconfigured textual patterns pertains to branding text of a second website of the one or more websites.

9. The computer program product of claim 8, wherein the analyzing further includes determining, after the preconfigured textual pattern is determined to exist in the text, whether the text violates branding compliance specifications configured by the second website.

10. The computer program product of claim 8, wherein the analyzing further includes determining, after the preconfigured textual pattern is determined to exist in the text, whether the branding text is authorized by the second website to exist in the text.

11. The computer program product of claim 1, wherein the data includes an average click rate for a web link associated with at least one website of the one or more websites, wherein the web link is listed within one or more search engine results.

12. The computer program product of claim 11, wherein the analyzing includes determining, based on the average click rate, an amount of visitors to the at least one website that is attributable to the one or more search engine results in relation to a total amount of visitors to the at least one website.

13. The computer program product of claim 1, wherein the classifying includes classifying at least one of the plurality of websites based on a business relationship between each of the at least one of the plurality of websites and a user.

14. A system for optimizing a website in accordance with search engine results, comprising:
at least one processor;
a network interface for receiving data from at least data source;
a memory, operatively coupled to the processor for storing logical instructions wherein execution of the logical instructions by the processor results in the performing of at least the following operations:
classifying each of a plurality of websites using at least one of a plurality of classifications;
acquiring data associated with the plurality of websites, wherein the data includes data pertaining to one or more ranked positions within a range of ranked positions that are associated with the plurality of websites and associated with one or more search engine results with respect to one or more keywords;
wherein the data pertaining to one or more ranked positions includes a first number of ranked positions associated with at least one website of the one or more websites; and
analyzing the data to achieve a result.

15. The system of claim 14, wherein the data further includes a total number of ranked positions within the range of ranked positions that are associated with the one or more search engine results; and wherein the analyzing includes dividing the first number of ranked positions by the total number of ranked positions to achieve the result.

16. The system of claim 14, wherein the data pertaining to one or more ranked positions includes a ranking value for each of the one or more ranked positions.

17. The system of claim 16, wherein the analyzing includes determining an average ranking of ranked positions for at least one website of the one or more websites.

18. The system of claim 14, wherein the one or more search engine results include organic search engine results and paid search engine results.

19. The system of claim 14, wherein the data includes text associated with a first website of the one or more websites and acquired from one or more search engine results.

20. The system of claim 19, wherein the analyzing includes determining whether a preconfigured textual pattern exists in the text.

21. The system of claim 20, wherein the preconfigured textual patterns pertains to branding text of a second website of the one or more websites.

22. The system of claim 21, wherein the analyzing further includes determining, after the preconfigured textual pattern is determined to exist in the text, whether the text violates branding compliance specifications configured by the second website.

23. The system of claim 21, wherein the analyzing further includes determining, after the preconfigured textual pattern is determined to exist in the text, whether the branding text is authorized by the second website to exist in the text.

24. The system of claim 14, wherein the data includes an average click rate for a web link associated with at least one website of the one or more websites, wherein the web link is listed within one or more search engine results.

25. The system of claim 24, wherein the analyzing includes determining, based on the average click rate, an amount of visitors to the at least one website that is attributable to the one or more search engine results in relation to a total amount of visitors to the at least one website.

26. The system of claim 14, wherein the classifying includes classifying at least one of the plurality of websites based on a business relationship between each of the at least one of the plurality of websites and a user.

* * * * *